US007922842B2

(12) United States Patent
Vianello

(10) Patent No.: US 7,922,842 B2
(45) Date of Patent: Apr. 12, 2011

(54) AUTOMATIC DEVICE AND METHOD FOR PERIMETRIC SEALING OF INSULATING GLAZING UNITS

(75) Inventor: Fortunato Vianello, Frazione Vallio (IT)

(73) Assignee: For.El. Base di Davanzo Nadia & C. S.N.C., Roncade (IT)

( * ) Notice: Subject to any disclaimer, the term of this patent is extended or adjusted under 35 U.S.C. 154(b) by 235 days.

(21) Appl. No.: 12/379,261

(22) Filed: Feb. 18, 2009

(65) Prior Publication Data

US 2009/0205768 A1 Aug. 20, 2009

(30) Foreign Application Priority Data

Feb. 20, 2008 (IT) .............................. TV2008A0032

(51) Int. Cl.
*B32B 41/00* (2006.01)

(52) U.S. Cl. ............ 156/64; 156/99; 156/105; 156/107; 156/109; 156/244.22; 156/356; 156/357; 156/575; 156/578

(58) Field of Classification Search .................... 156/64, 156/99, 105, 107, 109, 244.22, 356, 357, 156/575, 578; 118/688
See application file for complete search history.

(56) References Cited

U.S. PATENT DOCUMENTS 5,932,062 A * 8/1999 Manser ......................... 156/357
6,158,483 A * 12/2000 Trpkovski ....................... 141/63
2003/0059532 A1* 3/2003 Vianello ....................... 427/230

* cited by examiner

*Primary Examiner* — George R Koch, III
(74) *Attorney, Agent, or Firm* — Modiano & Associati; Albert Josif; Daniel J. O'Byrne

(57) ABSTRACT

An automatic device for perimetric sealing of an insulating glazing unit composed of at least two glass panes and at least one spacer frame supported and movable in a slightly inclined position with respect to the vertical on a conveyor. A sealing head movable with relative motion with respect to the glazing unit has at least one sealing nozzle suitable to deliver a sealant flow. In order to maintain the correct mutual position of said at least one sealing nozzle with respect to the cavities of the glazing unit to be sealed and to allow the spacing of the nozzle therefrom, a sensor is provided transversely to the plane of the insulating glazing unit that detects the distance from the glass pane. An actuation mechanism is further provided for the relative motion between the sealing head and nozzle and the glazing unit.

10 Claims, 12 Drawing Sheets

α
40

130
150b
20
100
Z
150a
ϑ
V
α
120
50
160

AUTOMATIC DEVICE AND METHOD FOR PERIMETRIC SEALING OF INSULATING GLAZING UNITS

The present invention relates to an automatic device and a method for perimetric sealing of insulating glazing units composed of at least two glass panes and at least one spacer frame having a complex profile.

BACKGROUND OF THE INVENTION

Currently it is known to deposit the spacer frame or the spacer profile on a glass pane and then mate the assembly to a second glass pane and seal it along the entire outer peripheral region so as to constitute the so-called insulating glazing unit or double glazing unit. Such operation can also be a multiple one in order to obtain the insulating glazing unit constituted by three glass panes and two spacer frames or profiles, as well as n glass panes and n−1 spacer frames or profiles. The operation can also relate to glass panes that have different dimensions despite belonging to the same insulating glazing unit, so as to obtain an offset between their edges, which is necessary for mating with a particular type of door or window, i.e., the one that constitutes the so-called continuous glazing or the so-called structural glazing. Frequently, the spacer frame or, more correctly, the profile that constitutes it, has a hollow rectangular transverse cross-section that is bevelled toward the outside of the double-glazing unit to accommodate a larger quantity of sealant, but sometimes spacer frames or, more correctly, spacer profiles are used which have complex transverse cross-sections. In this situation, the perimetric seal, in the background art, can only be performed manually.

The present invention relates indeed to these types of insulating glazing unit with spacer frames constituted by profiles having a complex cross-section.

In order to better define and understand the configuration of an insulating glazing unit in the combination of its components, i.e., the glass pane 2 and the spacer profile or frame 3, and as regards the final product, i.e., the insulating glazing unit 1, some concepts related to the intermediate components are summarized hereafter, with reference to FIGS. 1A to 1G and with the assumption that the subsequent use of the insulating glazing unit, i.e., as a component of the door or window, is known.

In order to provide a more efficient and intelligible description, it will be started hereinafter from the description of the final product and then to the product broken up into its components.

The insulating glazing unit 1 is constituted by the composition of two or more glass panes 2, which are separated by one or more spacer frames 3, which are generally hollow and finely perforated on the face that is directed inward. The spacer frames contain hygroscopic material 4 in their hollow part and are provided on the lateral faces with a butyl, first sealant 5, which constitutes the so-called first seal. The chamber (or chambers) delimited by the glass panes 2 and by the spacer frame (spacer frames) 3 is able to contain air or gas or mixtures of gases that give the double-glazing unit particular properties, for example thermally insulating and/or soundproofing properties.

Widespread use is made of a spacer profile 3 which has a substantially rectangular cross-section and is fabricated of expanded synthetic material (by way of non-limiting example: silicone and EPDM) which incorporates the hygroscopic material in its mass. Spacer frames constituted by profiles having a complex cross-section are also used and necessary.

The joint between the glass panes 2 and the spacer frame (frames) 3 is achieved by means of two levels of sealing: the first one with first sealant 5 is intended to provide tightness and initial bonding between such components and is applied to the lateral surfaces of the frame and the portions of the adjacent glass panes, already mentioned earlier; the second one with second sealant 6 is intended to provide final cohesion among the components and mechanical strength of the joint among them and is applied at the compartment constituted by the outer surface of the spacer frame 3 and by the faces of the glass panes 2 up to their edge (see FIGS. 1A to 1G). In the case of a spacer profile 3 made of expanded synthetic material, the first level of sealing is replaced with, or integrated by, an adhesive material, for example an acrylic one, which is already spread onto the lateral faces of such spacer profile and is covered by a removable protective film. This type of spacer profile will not be referenced further in the continuation of the description, since it is a very different type with respect to the one to which the present patent application relates.

The glass panes 2 used in the composition of the insulating glazing unit 1 can have different configurations depending on the use of such unit: for example, the outer pane (outer with respect to the building) can be normal or reflective (in order to limit the heat input during summer months) or laminated/armored (for intrusion prevention/vandalism prevention functions) or laminated/tempered (for safety functions) or combined (for example reflective and laminated, to obtain a combination of properties); the inner pane (inner with respect to the building) can be normal or of the low-emissivity type (in order to limit the dispersion of heat during winter months) or laminated/tempered (for safety functions) or combined (for example of the low-emissivity type and laminated to obtain a combination of properties). In particular, the outer glass pane 2M can be larger than the inner one (ones) 2*m* along the entire extension of the perimeter or only on one side or only on some sides (see FIGS. 1E and 1F). In particular, moreover, the cross-section of the profile that constitutes the frame can have a complex shape, for example a shape with fins toward the outside, such as the one with which the present invention deals.

The above summary makes it already evident that a manufacturing line for obtaining the insulating glazing unit product 1 requires many processes in sequence and, in particular, comprises the second sealing process, with which the present application deals in detail in the embodiment in which the spacer profile 3 has such a shape as to entail difficulties in such sealing, so much that before the present invention it was performed only manually.

Prior art documents belonging to the same field and describing automatic machines and automatic/manual methods for perimetric sealing by performing second sealing regard processes only directed to the step in which the sealing product is distributed automatically proximate to the spacer profile 3 having only a simple shape. Here, the profile 3 is mechanically joined to the glass panes 2 and alignment with the edges of the glass panes 2 or with the edge of the smaller glass pane 2*m* is made to provide mechanical bond between the spacer frame and the glass sheets and strength to the joint. This further allows to constitute a further tightness—providing barrier sealant 6 (the main barrier being constituted by the first butyl sealant 5) against moisture, which must not penetrate within the insulating glazing unit 1, and against the filling gas, which must not escape toward the outside of the insulating glazing unit 1. The most significant documents are believed to be:

EP0391884 B2 and corresponding U.S. Pat. No. 5,136,974, in the name of Lisec Peter, relating to a specific device for applying the sealant to the perimetric edge of the insulating glazing unit, and describing the correlation between the geometry of the perimetric joint, i.e., the distance between the glass panes and the difference in level between the outer face of the spacer frame and the edges of the glass panes, or the edge of the smaller glass pane, the relative speed between the extrusion head and the insulating glazing panel, the flow-rate of the dosage pump, in order to obtain complete filling of the perimetric joint without causing overflow of the sealant;

EP0471247 A1, in the name of Lenhardt Karl, relating to a specific device for applying sealant to the perimetric edge of the insulating glazing unit, either automatically, and therefore describing the components for pumping, dosage and controlled extrusion against the perimetric edge of the insulating glazing unit during the relative motion between the insulating glazing unit and the extrusion head, or manually, and therefore using only the components for the pumping and mixing of the automatic device but resorting to a manual extrusion gun for application to the insulating glazing unit, the dosage being entrusted to the manual skills and ability of the operator; this occurs when the profile of the spacer frame has a complex cross-section and therefore the automatic and progressive gauging of the cavity in order to adjust the dosage of the sealant is not possible.

Here a manual extrusion gun is used, which moreover is already background art albeit with other pumping criteria. Such process is the only one that allows, by resorting to equally known contoured nozzles, second manual sealing in the situation of spacer profiles that have a complex shape, particularly, by way of non-exclusive example, profiles with fins of the Schüco type.

Manual sealing operations, however are known to be difficult and to require highly skilled operators. Moreover, they do not provide any guarantee that the various sealings are made with a same efficiency and optimum quantities of sealing materials.

SUMMARY OF THE INVENTION

The aim of the present invention is to provide a device and a method for perimetric sealing of insulating glazing units that require no manual activity.

Within this aim, an object of the present invention is to provide a device that allows fully efficient and reliable sealing of the perimetric edge of the insulating glazing unit in the case of a spacer frame constituted by a profile that has a special shape (cross-section) without any manual intervention from an operator.

Another object of the present invention is to provide a device and a method that can be obtained and actuated with means available at advantageously low costs and requiring simple operations.

This aim and these and other objects, which will become better apparent hereinafter, are obtained with an automatic device and a method for perimetric sealing according to the present invention, that has the features set forth in claim 1 and, respectively, comprises the steps of claim 9.

In an advantageous aspect thereof, the inventive device is made by extending the known extrusion nozzle with one or more extensions capable of entering the (often confined) cavity or cavities to be sealed with a sometimes considerable cantilever extension with respect to the border of the glass panes (or of the smaller glass pane) and by means of a control of the transverse position with respect to the plane of the insulating glazing unit in order to maintain the centering of such extension or extensions in the cavity despite the less than perfect planarity of the glass panes and especially in view of the limitation of the transverse dimension of the cavity with respect to the dimension of the extension or extensions of the nozzle.

BRIEF DESCRIPTION OF THE DRAWINGS

Further characteristics and advantages of the invention will become better apparent from the following detailed description of a preferred but not exclusive embodiment thereof, illustrated by way of non-limiting example in the accompanying drawings, wherein:

FIG. 1A normal; FIG. 1B triple glazing unit; FIG. 1C laminated outer pane, low-emissivity inner glass; FIG. 1D tempered reflective outer pane, laminated low-emissivity inner pane; FIG. 1E laminated and stepped outer pane, low-emissivity inner pane (protruding part not treated with a spatula); FIG. 1F staggered laminated outer pane, low-emissivity inner pane (protruding part treated with a spatula); FIG. 1G like FIG. 1A, but with a spacer profile that has a complex shape; FIG. 1H cross-section of the spacer profile having a complex shape.

DESCRIPTION OF THE PREFERRED EMBODIMENTS

Figure 1A:
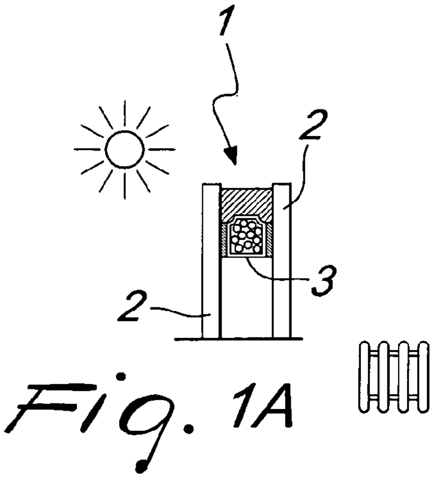
FIGS. 1A to 1H are schematic views of the peripheral portion of insulating glazing units that may be fabricated with the device and method according to the invention, in a non-exhaustive exemplifying series of possible combinations, namely.
Figure 1B:
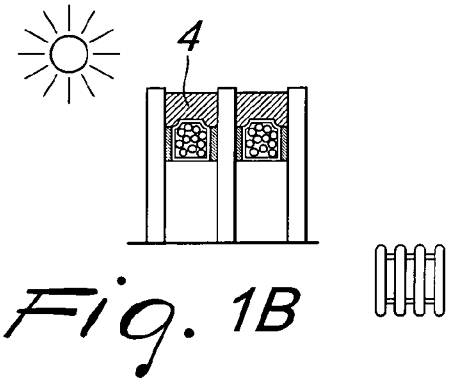
Figure 1C:
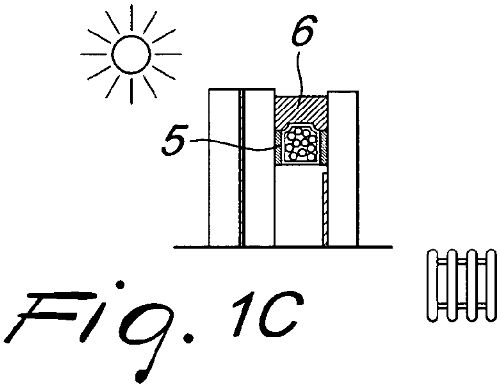
Figure 1D:
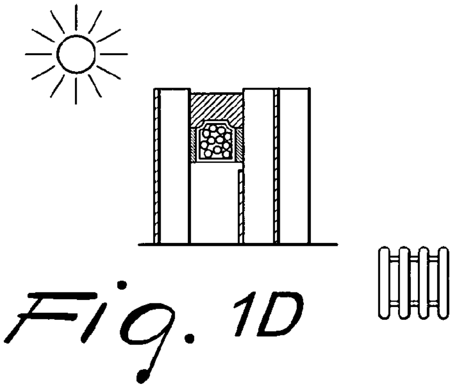
Figure 1E:
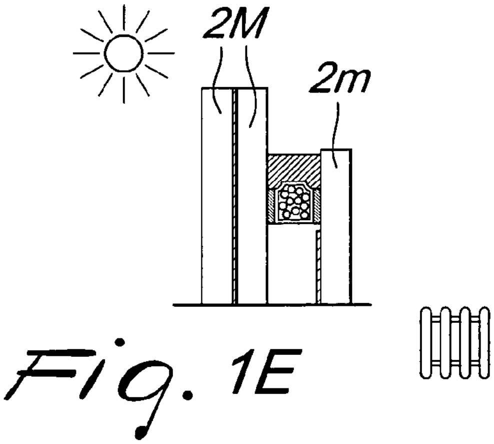
Figure 1F:
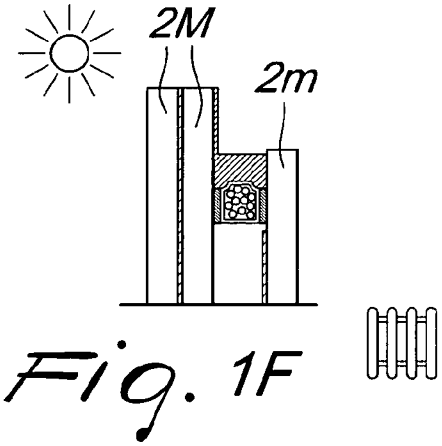

The criterion used in numbering the features of the figures has been the following: the products, the insulating glazing unit 1, the glass pane 2, the spacer frame 3, the desiccant 4, the first sealant 5, the second sealant 6 are designated by single-digit numerals. In particular, in order to distinguish the various possible shapes of the insulating glazing unit 1, the reference numeral 1 designates the most frequent situation (rectangular), the reference numeral 1' designates the polygonal shape, the reference numeral 1" designates the curvilinear shape, and the reference numeral 1'" designates the mixed shape.

The known components of the automatic sealing device generically designated 10 are designated by numbering with two digits and the interpolated synchronous movement axes of the automatic sealing device 10 are designated respectively by the reference letter H for the horizontal axis, by the letter V for the vertical axis, by the letter θ for the rotation axis of the sealing head. The main inventive components of the inventive device are designated with references between 100 and 200, and have thus three-digit numbering.

The known part of the automatic sealing machine 40, i.e., the part that according to the background art leads to the automatic sealing of insulating glazing units in which the spacer frame is constituted by a profile that has a simple traditional cross-section, is described first.

With reference to the figures, an insulating glazing unit is generally designated by the reference numeral 1.

Figure 1G:
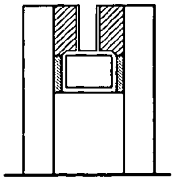
Figure 1H:
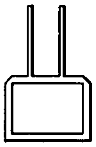

In all of the FIGS. 1A to 1H, a spacer frame 3 is shown in its hollow transverse cross-section filled with hygroscopic material 4. The two types of sealant used are highlighted: in closer hatch lines, a first, butyl sealant 5, which has the function of an initial bond among the components and of a seal (first seal), applied between the lateral surfaces of the spacer frame 3 and panes 2; in more distant hatch lines a second, polysulfide or polyurethane or silicone sealant 6, which has a mechanical strength (second sealing) function, applied between the outer surface of the spacer frame 3 and the faces of the glass panes 2 up to the edge of the glass panes 2 or to the edge of the glass pane 2*m* that has smaller dimensions. FIGS. 1G and 1H illustrate solutions in which the spacer 3, constituted by a profile having a complex cross-section, must be affected by the second seal 6 only in certain portions, while others must be free from sealant.

The inner/outer orientation of the glazing unit is identified visually with icons that represent the sun (outer side) and the radiator (inner side). These figures show that the insulating glazing unit 1 can have multiple shapes. Thus, the machines for applying the second seal must be special and versatile as well as innovative (for example to also seal the insulating glazing unit 1 whose spacer frame has a complex profile).

In the variant in which the glazing unit 1 is composed of at least two glass panes 2 and at least one spacer frame 3 but it is not yet provided with the second sealant 6 as defined earlier and originates from a previous processing machine, typically a mating/pressing machine, or a gas filling machine, or fed manually or by means of a feeder onto the known input conveyor 20, the glazing unit 1 advances along a longitudinal or "horizontal" axis H, conveyed by support and traction rollers or belts. However the advancement is kept in step by way of the synchronous actuation 160 constituted by a horizontal carriage that is actuated by a synchronous motor by means of a reduction unit and a belt drive and other known components up to a sucker that mates with the glass pane 2 on the operator side. The actuation 160 provides movement along the longitudinal/horizontal axis H up to a slowing sensor and a directly subsequent stop device, both of which are known, so as to arrange the insulating glazing unit 1 in the correct arrangement with respect to the extrusion or sealing head 100 and allow the beginning of the process for applying the second sealant 6. Beforehand, the head 100 which can move vertically along a vertical axis V, since it is applied to actuation means 120 comprising a vertical carriage, actuated by way of the action of a synchronous motor and of a reduction unit and of other components of known structure, all of which are supported on the frame 50 of the sealing machine 40 and control the vertical motion of the head, has been positioned in the process start status. The head 100 is also provided with a rotary motion about a rotation axis θ. Rotation is actuated by driving means 125 comprising a rotating assembly with a synchronous motor, a reduction unit, a toothed pinion and a crown gear, which act on the centering and supporting center bearings of a hollow shaft. Such components are all of a known structure, but are referenced here since they contain internally and in a cantilever arrangement elements of the invention that are operatively connected to the head 100.

Figure 10A:
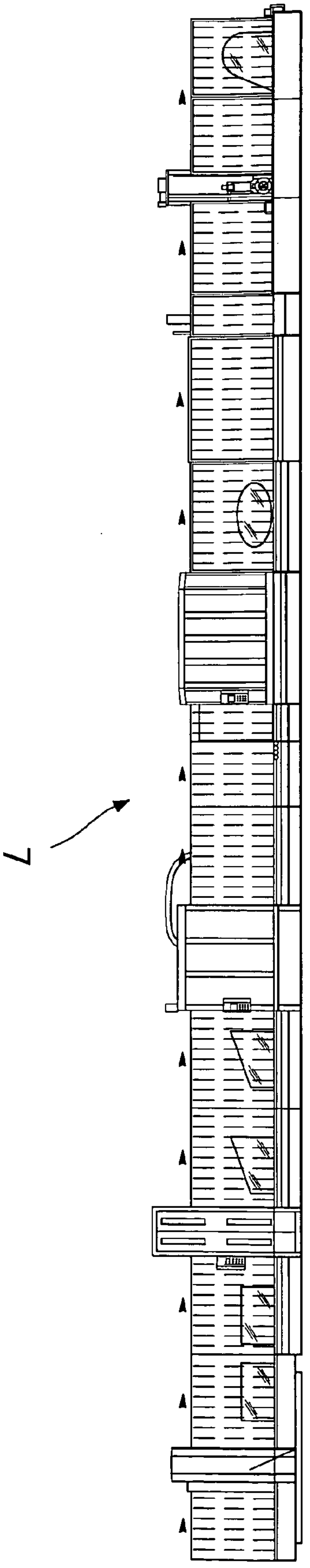
FIG. 10A is a view showing an example of insertion configuration of the device according to the invention and of the automatic sealing machine in a processing line for manufacturing the insulating glazing unit (seen in a perspective view) and does not comprise the electrical/electronic panel, the control post and the protection devices.
Figure 10B:
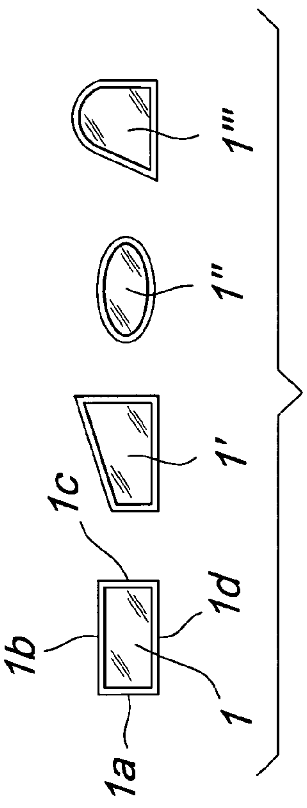
FIG. 10B shows configurations of glazing units with shapes other than rectangular.

At this point, the synchronized movements: the horizontal motion along the axis H of the insulating glazing unit 1 by means of the known mechanisms and actuation systems cited above; the vertical motion along the axis V of the head assembly by means of the known mechanisms and actuation systems of the actuation means 120 mentioned above; and the rotary motion along the axis a of the head assembly by means of the known actuation systems and mechanisms of the driving means 125 referenced above (which intervene to perform the 90° rotation to switch the orientation of a nozzle 102 or of nozzles 102*a* and 102*b* to interface with the vertical side or with the horizontal side of the rectangular insulating glazing unit 1, or to perform finite or progressive rotations to interface the nozzle 102 or the nozzles 102*a* and 102*b* with the perimeter of the insulating glazing unit 1 when it has the shapes 1', 1" or 1'", other than the rectangular shape, shown in FIG. 10B) interact to initially bring into contact the perimetric edge of the insulating glazing unit 1 with the extrusion nozzle 102 or the extrusion nozzles 102*a* and 102*b* and keep it for the entire path, mating with its shape, be it rectangular 1 or other than rectangular 1', 1", 1'". The movement of the conveyor 20 and of the head 100 are thereby performable in a synchronous manner so that perfect and controllable alignment of the nozzle/nozzles of the head 100 with the sides of the glazing unit is achieved.

Further details of the elements above will be obvious to those skilled in the art since they belong to the background art. Everything related to the distribution of the sealant starting from metering devices 150*a* and 150*b* up to the extrusion nozzle 102 or nozzles 102*a* and 102*b* is made with means that belong to the background art.

The detailed description is now given of preferred but not exclusive embodiment of a main inventive part of the device according the present invention, i.e., the part which, combined with the elements of the structure part described above, is suitable for sealing automatically the insulating glazing units 1 in which the spacer frame 3 has a profile with a complex cross-section.

A preferred but not exclusive way of carrying out the invention is the one described hereafter with reference to FIGS. 2 to 6.

Figure 2A:
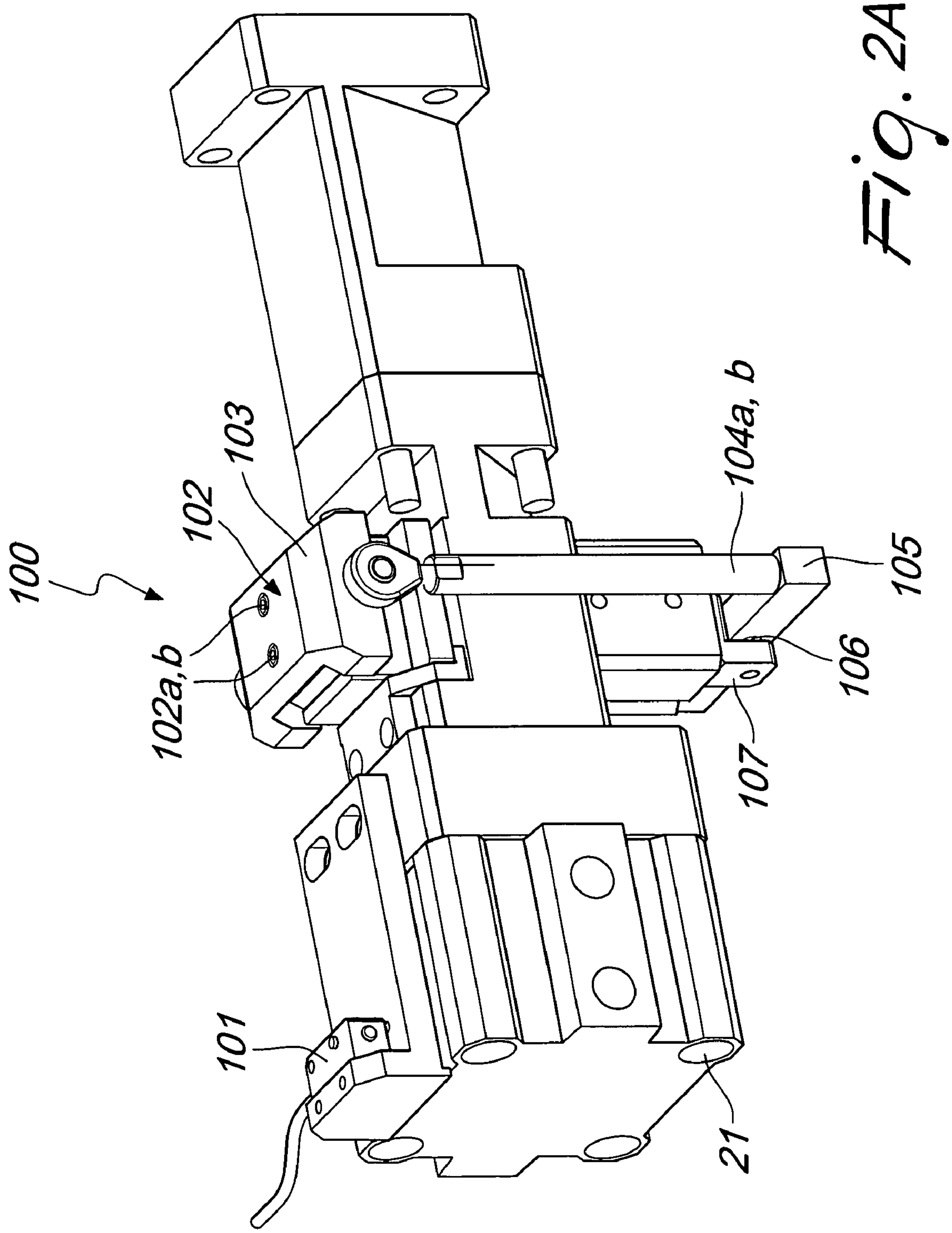
FIGS. 2A and 2B are general views of the device according to the invention, which includes inventive parts.
Figure 2B:
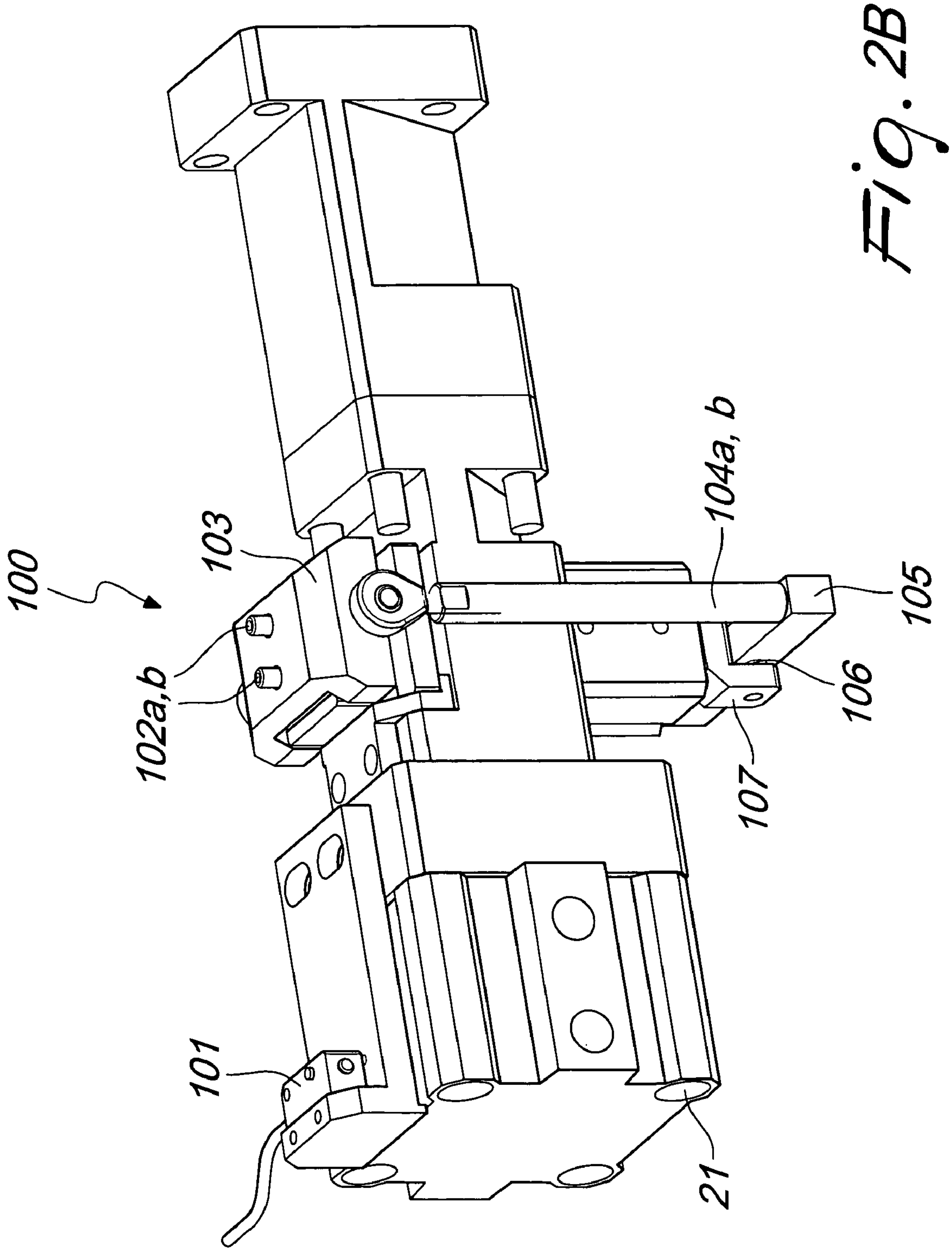
Figure 3:
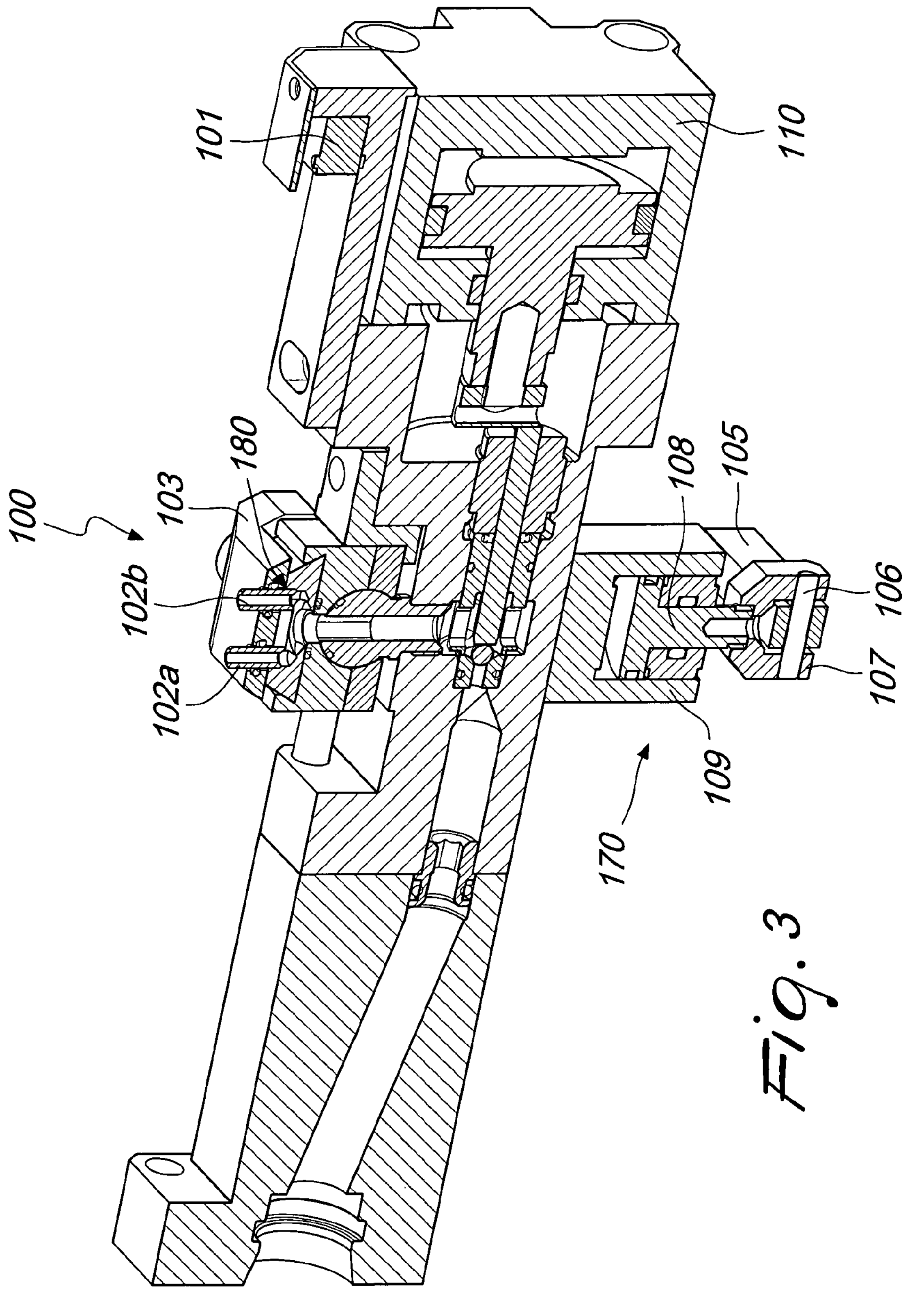
FIG. 3 is a perspective sectional view of the device of FIGS. 2A and 2B.
Figure 4:
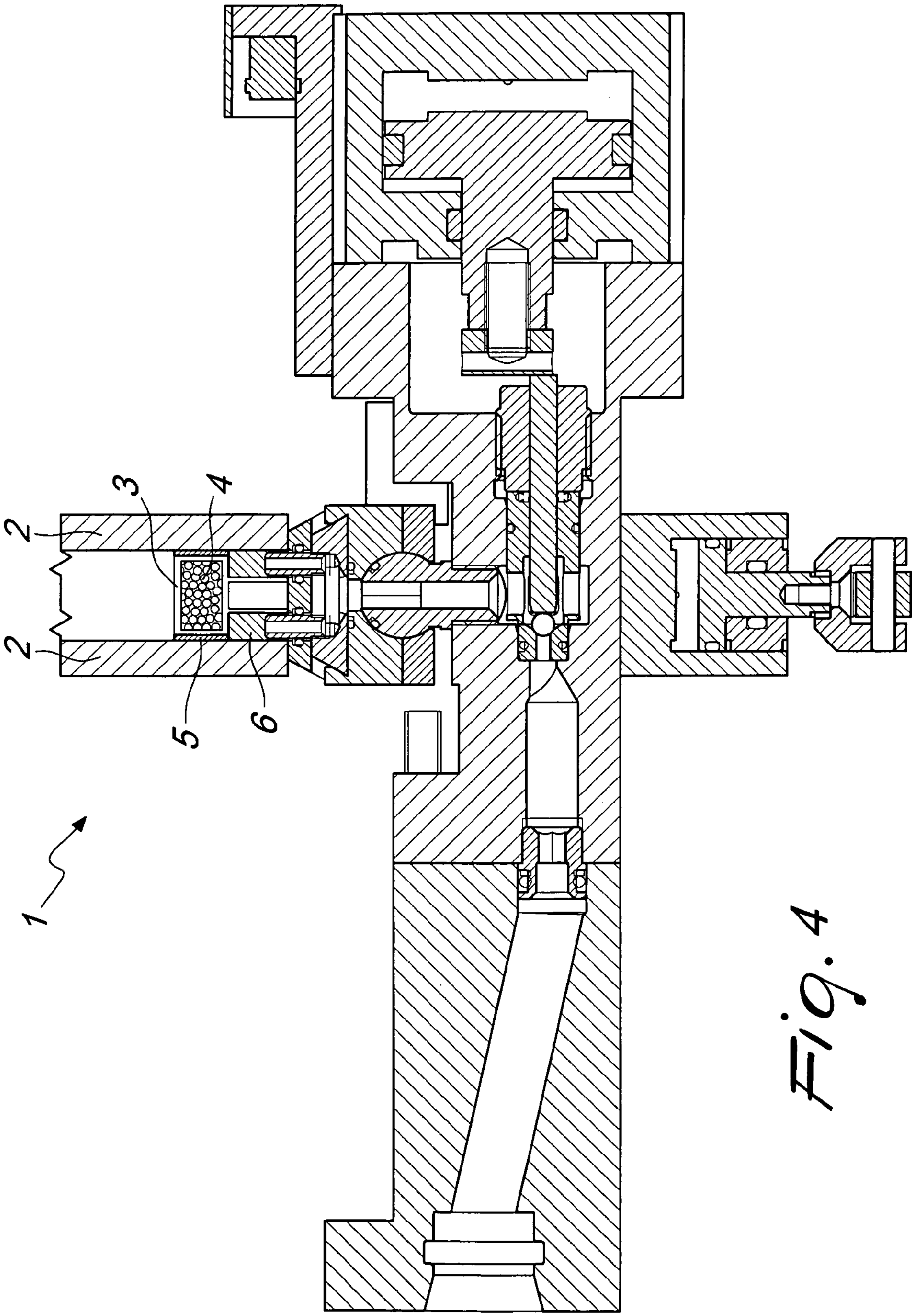
FIG. 4 is a sectional view of the device of FIGS. 2A and 2B taken transversely to the plane of the insulating glazing unit that illustrates the interaction of the nozzle and of its extensions with the perimetric edge of the insulating glazing unit during the step for extrusion of the second sealant.
Figure 5:
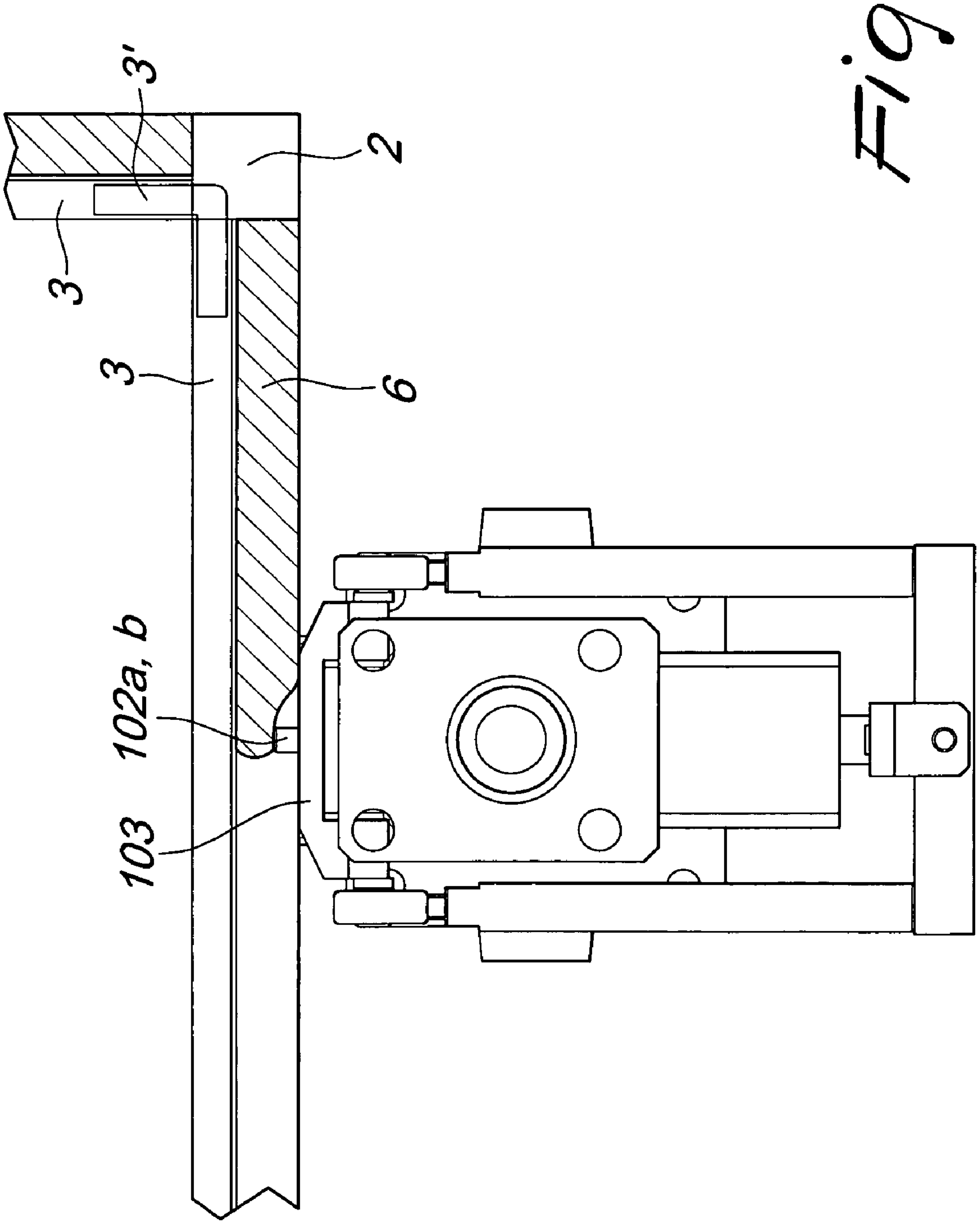
FIG. 5 is a view of the device of FIGS. 2A and 2B with a longitudinal sectional view of the insulating glazing unit under work, illustrating the interaction of the nozzle on the operator side or rather of its extension with the perimetric edge of the insulating glazing unit during the step for extrusion of the second sealant, with the delimitation at the margin of the glass panes performed by the plate.
Figure 6:
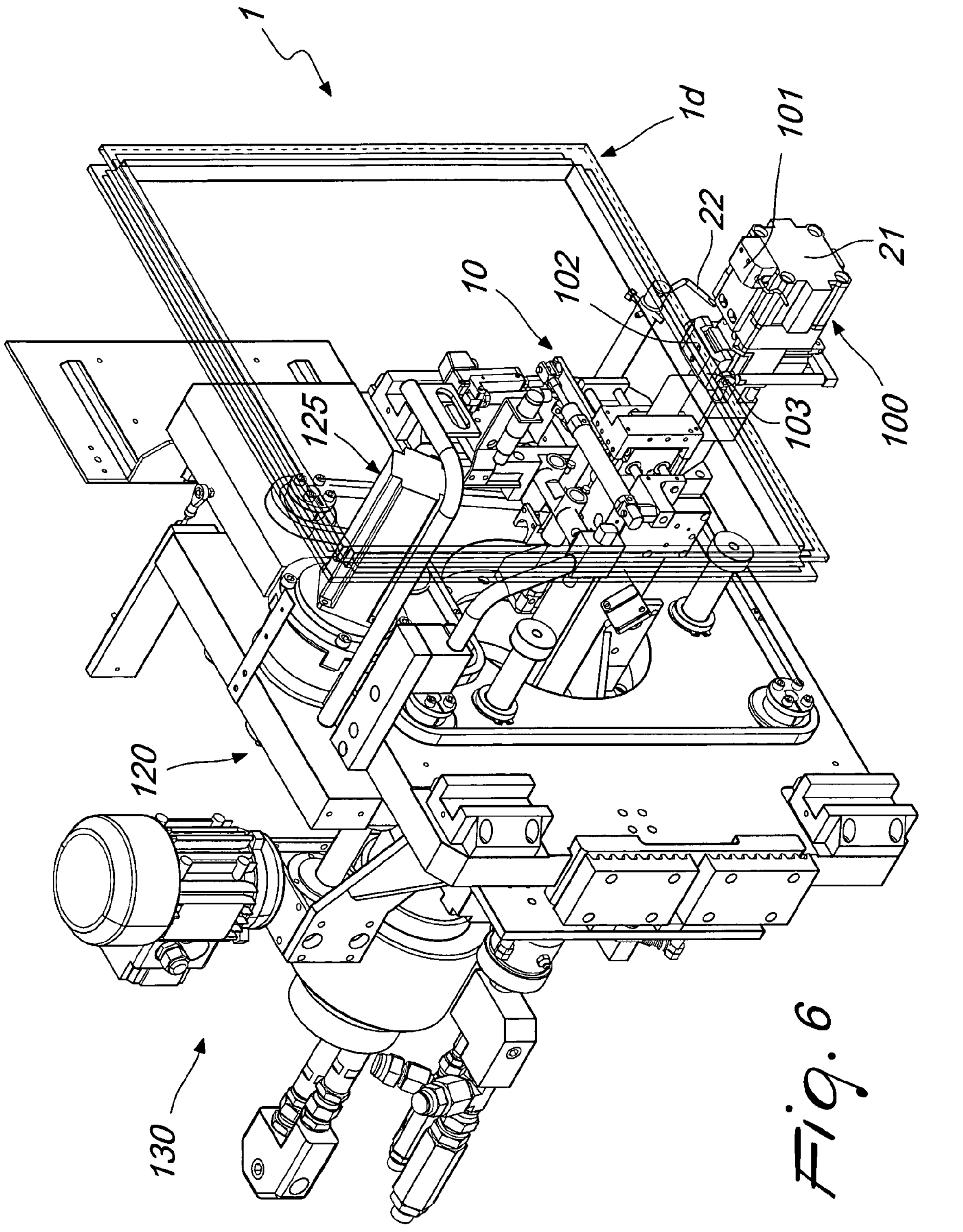
FIG. 6 is a perspective view showing details of the mating of the parts of the device according to the invention (such as the extrusion nozzles and the plate) with the known components of the automatic sealing machine (such as the probe for measuring the depth of the spacer frame, in its inactive position) in the step for sealing the lower side of the insulating glazing unit, the known cylinder for actuating the flow control element, which is also known, being indicated.
Figure 7:
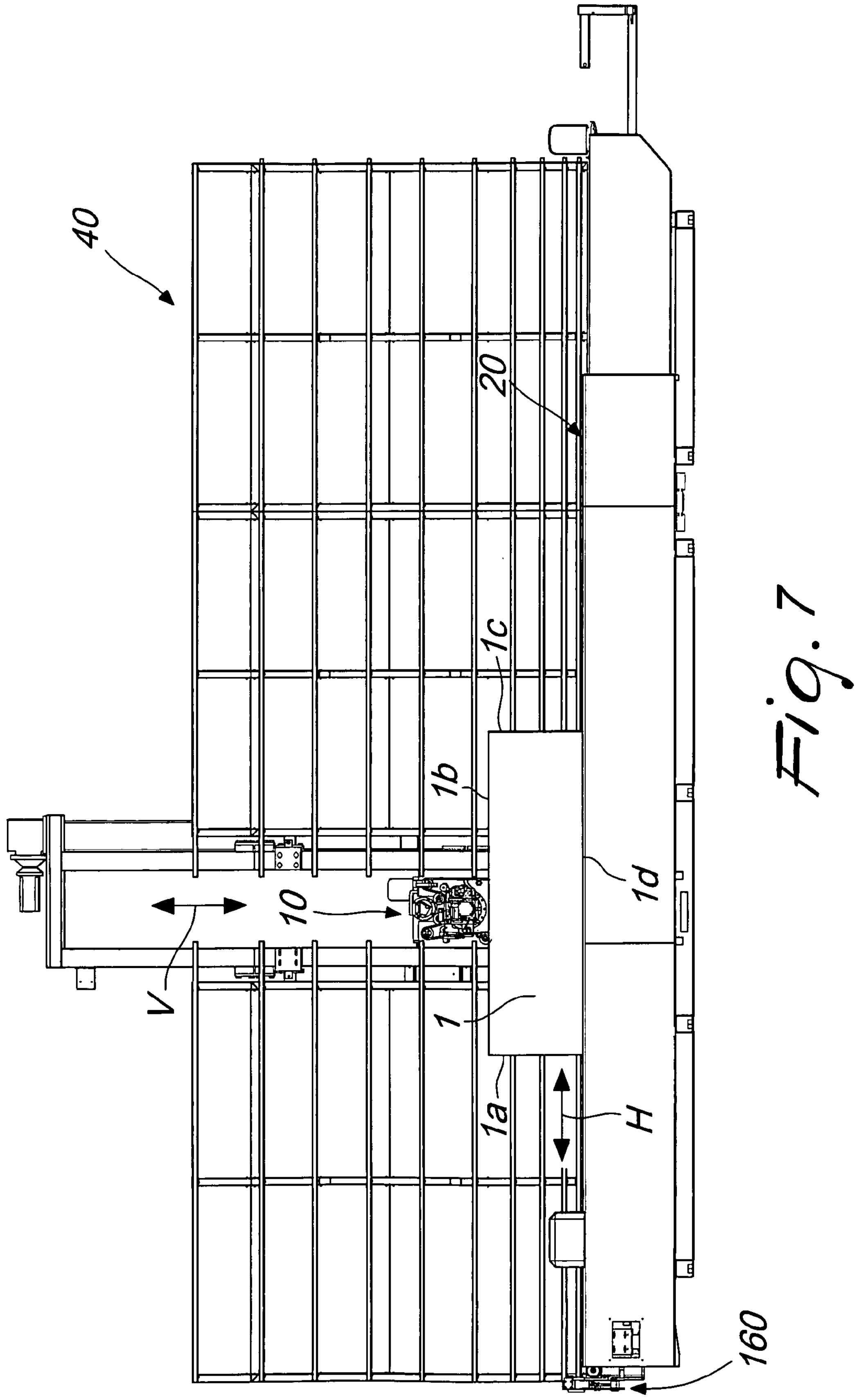
FIGS. 7, 8 and 9 are views of the complete machine, showing mainly, respectively its known parts in the main views: front overall view (FIG. 7), with identification of the horizontal axis H for the movement of the insulating glazing unit and of the vertical axis V for the movement of the extrusion head, and with the arrangement of the insulating glazing unit complete with identification of its sides in the typical progression of the steps of the sealing process; lateral overall view (FIG. 8), with identification of the vertical axis V and of the rotation axis θ for the orientation of the extrusion nozzles; full rear view (FIG. 9) showing two double dosage units (for two two-part sealants, for example polysulfide or polyurethane sealant for traditional insulating glazing units, silicone for structural insulating glazing units), of an electrical panel.
Figure 8:
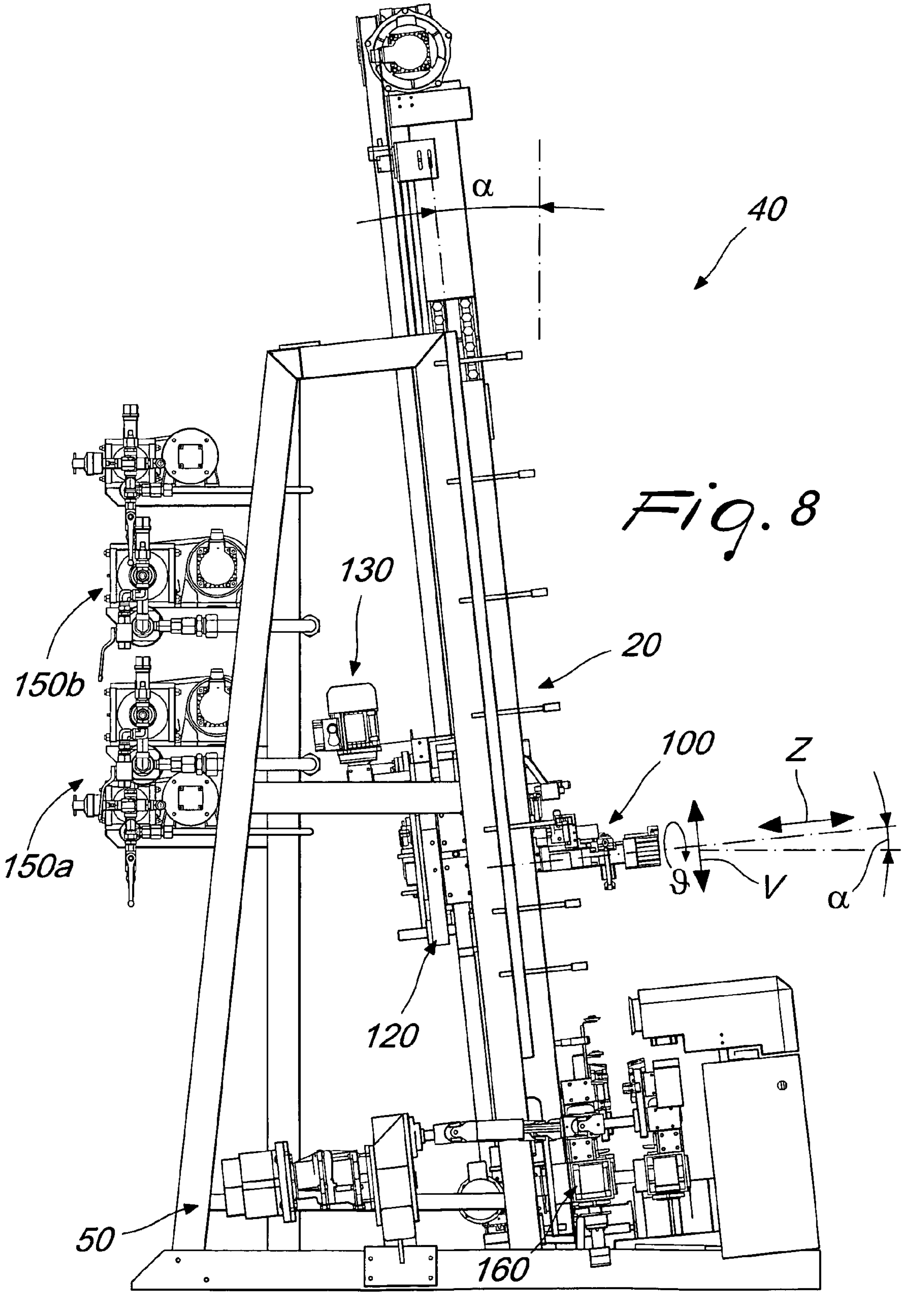
Figure 9:
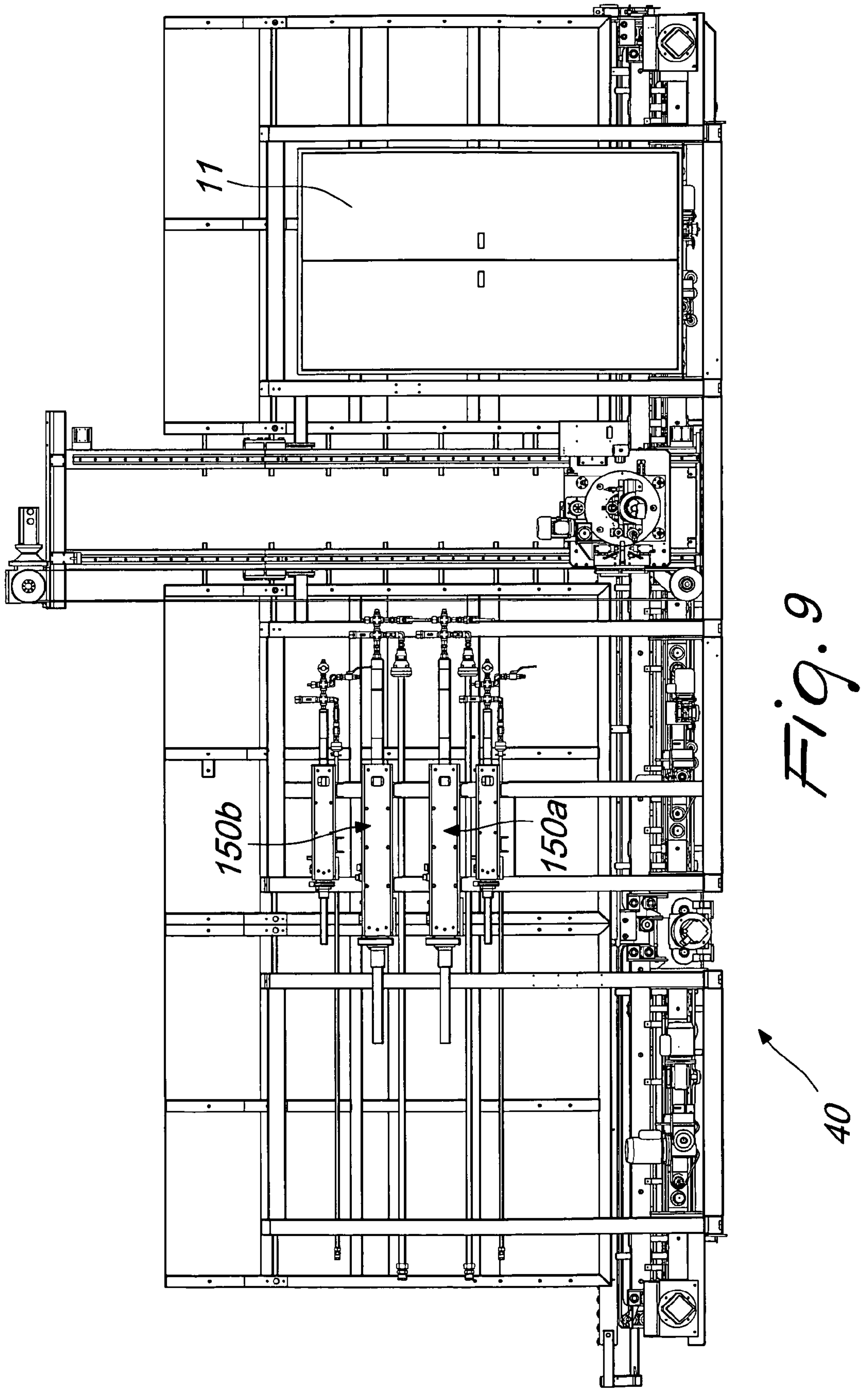

FIGS. 2A and 2B show the extrusion nozzle 102 of the sealing head 100 and an ultrasound sensor 101, in a perspective view which however excludes the known parts of the machine, since they are described already in detail in the prior art documents mentioned earlier. In FIG. 2A, a containment plate 103 is aligned with the ends of the nozzles 102*a*, 102*b*; in FIG. 2B, the plate 103 is retracted with respect to the nozzles 102*a*, 102*b*.

In relation with the orientations of the various elements of the claimed invention as herein defined, it will be considered: when reference will be made to "vertical", this shall be understood to mean "slightly inclined with respect to the vertical direction", and likewise, when reference will be made to "horizontal", this shall be understood to mean "slightly inclined with respect to the horizontal direction". The conveyance of the insulating glazing unit 1 in fact occurs on conveyors whose resting surface is inclined by an angle $\alpha$ of approximately 6° with respect to the vertical plane, and likewise the rollers or other lower supporting/transport elements have their axis inclined by the angle $\alpha$ of approximately 6° with respect to the horizontal plane. The term "slightly inclined", therefore is to be intended to refer to angles of inclination with respect to the horizontal or vertical direction of up to approximately 6°.

What is solved in the background art, i.e., the centering of the nozzle 102 or of the nozzles 102*a* and 102*b* in the transverse direction with respect to the face of the insulating glazing unit 1 so as to be arranged on the centerline of the spacer profile 3, achieved generally by means of the axial movement of the sealing head 100 along the transverse axis Z, based on the measurements of the thickness of the glass pane that is directed toward the conveyor and of the thickness of the spacer profile (measurements performed with preferably mechanical known devices mated with a potentiometer at the inlet of the sealing device), is no longer sufficient when the spacer profile has a complex cross-section and with narrow and deep cavities and/or the glass panes 2 are not sufficiently planar.

In the case of a profile having a complex cross-section, for example the Schüco profile with fins, the cavity configuration and the depth to which the nozzle 102 or nozzles 102*a* and 102*b* must penetrate (whereas in the case of simple traditional profiles the nozzle or nozzles are monolithic with the plate 103, with respect to which such nozzles do not protrude since they are simply constituted by holes on the containment plate 103) require continuous adjustment of the transverse position of the nozzle 102 or nozzles 102*a* and 102*b*. Otherwise such nozzle or nozzles, being slightly smaller than the width of the space to be sealed, would scrape against the faces of the glass panes 2 even for minimal non-planarities thereof or for a minimal non-parallel arrangement of the vertical axis V with respect to the plane of the conveyor. Moreover, this adjustment constitutes an advantageous improvement also in the case of spacer profiles that have a simple shape if, in a situation which is frequent in the case of laminated or tempered glass panes, the glass panes are significantly not planar, and the adjustment has to be performed also by taking into consideration such non-planarity. This is because configuration of the nozzle 102 or nozzles 102*a* and 102*b* that is maintained on the initial and localized measurement of the dimensions of the components of the insulating glazing unit 1 would no longer be centered on the spacer profile 3 since the non-planar configuration of the glass panes 2 would twist or warp the profile, off-center with respect to the nozzle or nozzles.

The containment plate 103 must remain constantly in adhesion against the edges of the glass panes 2, so as to define a border for containing the sealant during its extrusion step, and in particular at the end of the sealing process the plate 103 must slide transversely with respect to the plane of the insulating glazing unit 1, i.e., along the transverse axis Z, so as to separate from it but with a spatula-like action with respect to the sealant. According to a further inventive idea of the present invention, the above condition is met with the nozzle 102 or the nozzles 102*a* and 102*b* that are rendered independent of the plate 103, and the plate 103 is provided with an adjustment motion with respect to the nozzle 102/nozzles 102*a*, 102*b*. This is achieved by means of an adjustment motion actuator 170, for example a pneumatic cylinder 109 whose stem 108, by means of a fork 107, a pivot 106, a cross-member 105 and brackets 104*a*, 104*b*, produces the movement of the plate 103 with respect to the nozzle 102/nozzles 102*a* and 102*b*. Since this movement is a relative plate/nozzle movement, the nozzles, which during the sealing process protruded with respect to the plate 103, at the end of the sealing process move away from the sealed cavity by way of the action of known mechanisms, while at the same time the pneumatic cylinder 109 is actuated so that the plate 103 remains in adhesion on the edges of the glass panes 2 that constitute the insulating glazing unit 1 and in the subsequent step can slide transversely to the plane of the insulating glazing unit 1 along the transverse axis Z. Any different solution in the case of nozzles that penetrate the cavity to be sealed at the end of the cycle would cause either interference with the glass panes 2 or the removal of sealant.

Throughout the perimetric sealing step, the sensor 101 which may be, but not only, an ultrasound sensor mounted on the head 100, is suitable to detect continuously its position or rather its distance from the face of the glass pane 2 and as soon as such distance deviates from the value measured initially before the sealing of a vertical side 1*a* of the insulating glazing unit 1, a feedback provided toward an adjustment actuator 130 that moves the sealing head 100 at right angles to the face of the insulating glazing unit 1, i.e., along the transverse axis Z, restores the set distance, so that the nozzle/nozzles remain constantly centered on the respective cavities to be sealed, despite the non-planarity of the glass panes or the non-parallel arrangement of the vertical axis of the sealing head and the vertical edge of the insulating glazing unit or the imprecise arrangement of the base of the insulating glazing unit on the conveyor.

The device 10 may further comprise a servomechanism 180, of a known type, mounted on the head 100, that is suitable to provide centering of the nozzle 102/nozzles 102*a* and 102*b* by acting locally on the nozzle/nozzles instead of on the entire head 100.

The stoichiometric flow-rate of sealant is determined according to the background art as a product of the sealing speed by the cross-section of the cavity to be sealed, such cross-section being derived by multiplying the width (or sum of widths in the case of special profiles having multiple cavities) by the depth and such depth being measured by means of known measuring devices 22 continuously during the sealing process, since such depth is not constant but depends on the arrangement of the spacer profile 3 with respect to the edges of the glass panes 2. This flow-rate is thus provided and controlled by one or more dosage units of the piston type.

In the case of an insulating glazing unit 1 that has a contoured shape, i.e., a non-rectangular shape, the information related to its shape is entered electronically by means of known methods (by means of a keyboard, floppy disk or network) or with innovative techniques, such as acquisition by means of a scanner.

The process for producing the insulating glazing unit 1 comprises generally, by way of non-limiting example, the following steps, performable all or only part of them, each step requiring a corresponding and particular machine to be arranged in series with respect to the other complementary ones:

edging on the peripheral face of the pane to remove any coatings (generally of the type obtained with nanotechnology techniques) in order to allow and maintain over time the bonding of the sealants;

beveling of the sharp edges of the glass pane, both to eliminate edge defects introduced by the cutting operation and to reduce the risks of injury in subsequent handling both of the glass panes 2 and of the insulating glazing unit 1;

washing of the individual glass panes, with an alternation of inner pane/outer pane (the orientation being the one defined earlier);

application of the spacer frame and first sealing: the spacer frame 3 manufactured beforehand, filled with hygroscopic material 4 that is intended to absorb the moisture incorporated within the chamber during the manufacturing process and any moisture that might penetrate subsequently is applied to one of the panes that constitutes the insulating glazing unit 1 in an appropriately provided station of the line for production of the insulating glazing unit 1. The spacer frame 3 is covered on its lateral faces with a first thermoplastic sealant 5 which has tightness-providing functions, in machines that are external or separate with respect to the production line of the insulating glazing unit 1;

mating and pressing of the assembly of the panes 2 and the frame (frames) 3;

filling with gas of the chamber (chambers) thus obtained after pressing or during the process of the preceding paragraph, prior to the mating of one of the two (or more, interleaved by a spacer frame, in the case of multi-chamber insulating glazing units) panes 2 with the other pane (or panes) 2 provided with a spacer frame 3;

second sealing of the assembly of the components glass panes 2, spacer frame (frames) 3, with a second sealant 6 at the perimeter.

The process with the steps listed above and performed entirely with the automatic device according to the invention was previously performed partially by machines and partially manually. In the case of second sealing of insulating glazing units 1 composed of two or more glass panes 2 and one or more spacer frames 3 of the type having a complex cross-section, the process was performed, prior to the invention according to the present application, exclusively manually.

Of course, all the movements linked to the steps of the fabrication cycle of the present invention are mutually interlocked by way of the aid of a logic system that is parallel but always active, in order to prevent, during the process, conditions of mutual interference between the actuators and the material being processed.

The present invention is susceptible of numerous constructive variations (with respect to what can be deduced from the drawings, whose details are evident and eloquent), all of which are within the scope of the appended claims; thus, for example, the mechanical solutions for the relative movement of the plate 103 and the nozzles 102/102*a*, 102*b*, which might also be adjusted or registered with intermediate positions as a function of the shape and dimensions of the spacer frame 3 having a complex cross-section, the electronic/mechanical solutions for centering the nozzle/nozzles, et cetera, the actuation means, which can be electrical, electrical-electronic, pneumatic, fluid-operated and/or combined, et cetera, the control means, which can be electronic or fluidic and/or combined, et cetera.

All the details may further be replaced with other technically equivalent ones. The materials and the dimensions may be any according to requirements arising in particular from the dimensions (a base 1*d* and the height 1*a*) and/or the shape of the insulating glazing unit 1.

Figure 11:
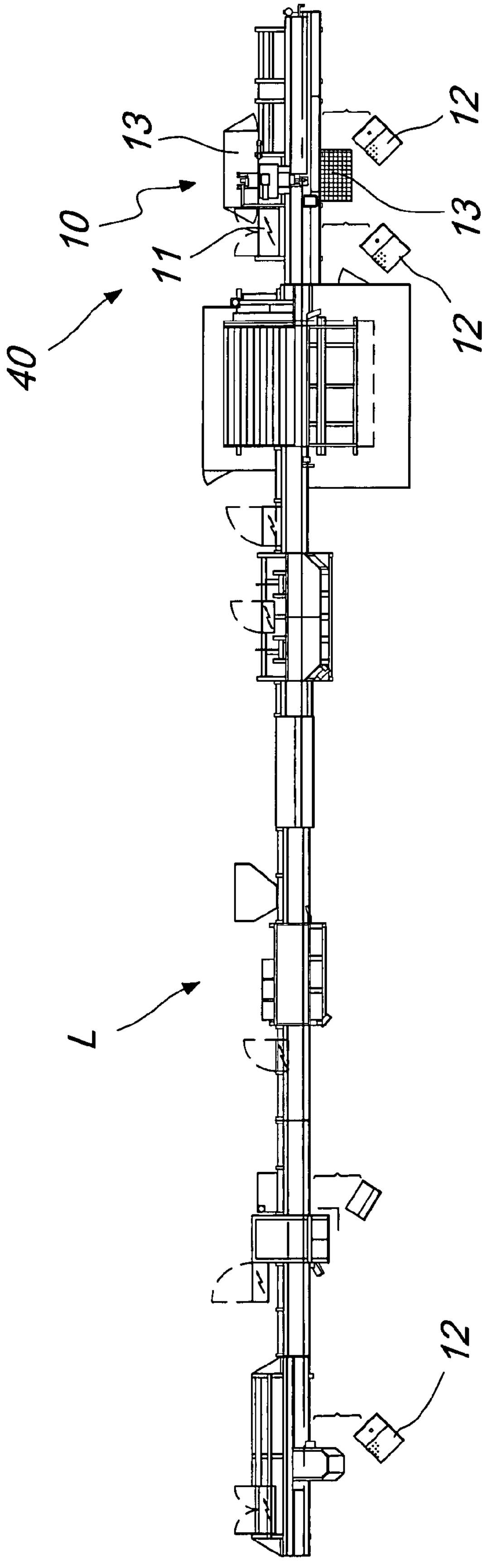
FIG. 11 shows an example of insertion configuration of the device according to the invention and of the automatic sealing machine in the line for the production of the insulating glazing unit (seen in plan view).

The description and the figures given above refer to an automatic sealing machine 40, which is arranged at the end of the line L for the production of insulating glazing units and with respect to which the source machines (mating unit/press or gas filler) are arranged to the left of the machine 40, as shown in FIG. 11. It is easy to imagine a description and corresponding figures in the case of mirror-symmetrical or otherwise different arrangements, for example including variations of the direction of the line.

The line L also includes (see FIGS. 10A and 11) an electrical/electronic panel 11, a control post 12 and the protection devices, generally designated by the reference numeral 13, be they of the type of mechanical protections or optical barriers or laser barriers or electrically sensitive mats, et cetera, since particular attention is given not only to the functional, qualitative, productive aspects of the content of the present invention but also to the aspects related to accident prevention. The electrical panel 11 and the control post 12 differ from the ones according to the background art in the implementation of all the controls and actuation systems needed to operate the devices of the series 100-200 according to the present invention.

In general, the succession of the sides of a glazing unit in the sealing process, described and indicated as first rear (with reference to the direction of the processing line) vertical side 1*a*, second horizontal upper side 1*b*, third vertical front side 1*c*, fourth horizontal lower side 1*d*, can be changed according to the global requirements of the production line of the insulating glazing unit 1, for optimizing the cycle time, for the alternation of the staggered sides with respect to the non-staggered ones, et cetera. In any case, a different succession does not entail modifications of the inventive concept but entails merely an intervention, which in any case is not complex, on the management software of the machine.

In practice it has been found that the invention achieves the proposed aim and objects, providing a machine with an automatic device for automatically performing second sealing in a highly efficient and reliable manner, for glazing units having any of the known configurations and without requiring any manual intervention from operators.

An insertion configuration of the device according to the present invention in the production line of glazing units is shown in FIGS. 10A and 11, which has highly advantageous operation in industrial application.

The disclosures in Italian Patent Application No. TV2008A000032 from which this application claims priority are incorporated herein by reference.

What is claimed is:

1. An automatic device for perimetric sealing of an insulating glazing unit having a compartment delimited by a spacer frame and by inner faces of two glass panes facing each other and attached to the spacer frame along first and second sides thereof, the device comprising: a conveyor, which is suitable to support thereon and convey an insulating glazing unit, in a slightly inclined arrangement with respect to a vertical direction, with a synchronous movement along a longitudinal axis that is parallel to a base of the insulating glazing unit; at least one sealing nozzle; a sealing head, said at least one nozzle being supported on said head and being suitable to deliver a sealant flow which is dosed according to a depth and width of the compartment of the glazing unit to be sealed and according to a relative motion speed of the sealing head and of the insulating glazing unit one with respect to the other; actuation means; driving means; said sealing head being actuatable by way of said actuation means with a synchronous movement along an inclined axis that is slightly inclined with respect to the vertical direction and is perpendicular to the base of the insulating glazing unit and by way of said driving means with a synchronous rotary motion about a rotation axis which is perpendicular to a face of the glass panes of the insulating glazing unit; and an adjustment actuator for actuating said head with an adjustment motion along a transverse axis that is perpendicular to the face of the glass panes of the glazing unit in order to position the at least one nozzle on a centerline of the spacer frame, the centerline portion being established as a function of an actual thickness of a glass pane in contact with the conveyor and of the spacer frame, and wherein said sealing head is actuatable during relative motion of the head with respect to the insulating glazing unit along a perimeter of the insulating glazing unit, to move continuously transversely to the insulating glazing unit along said transverse axis so that said at least one sealing nozzle remains constantly positioned on the centerline of the spacer frame or of portions of the spacer frame.

2. The device according to claim 1, comprising a sensor located on said head and being provided with a reference thereof, said sensor being suitable to detect a distance between the reference thereof and an outer face of the glass pane that lies opposite with respect to the conveyor for positioning the sealing head before sealing and to issue a signal corresponding to said distance, the corresponding signal being usable to actuate transverse positioning of the sealing head along said transverse axis so that said at least one nozzle remains centered on the centerline of the spacer frame throughout the sealing by maintaining a set distance between the sensor and the outer face of the glass pane.

3. The device according to claim 2, wherein said sensor is adapted to detect said distance and issue said signal by considering non-planarity of the glass panes that constitute the insulating glazing unit whereby to actuate transverse positioning of the head in relation with an actual shape of the spacer frame.

4. The device according to claim 1, further comprising a servomechanism for centering said at least one nozzle, said servomechanism acting locally on said at least one nozzle instead of on the head.

5. The device according to claim 4, wherein said at least one nozzle is mounted so as to protrude with respect to a containment plate of said head that is slidable on edges of the glass panes.

6. The device according to claim 5, wherein said containment plate is movable with adjustment or registration motion with respect to said at least one nozzle by action of said adjustment motion actuator, a mutual position between said at least one nozzle and said plate being thereby selectably set from a position in which said at least one nozzle protrudes with respect to the plate, and a position of alignment of said at least one nozzle with the plate.

7. The device according to claim 6, wherein said adjustment motion actuator is a linear actuator/pneumatic cylinder.

8. The device according to claim 5, wherein said plate is activatable from the position of alignment of the plate with said at least one nozzle for providing extraction of the plate from said alignment position with a transverse motion with respect to an edge of the insulating glazing unit along said transverse axis, so that any interfering of said at least one nozzle with the glass panes of the glazing unit is prevented.

9. A method for perimetric sealing of an insulating glazing unit having a compartment delimited by a spacer frame and by inner faces of two glass panes facing each other and attached to the spacer frame along first and second sides thereof, with a device for perimetric sealing, as set forth in claim 1, the method comprising:

conveying an insulating glazing unit supported on a conveyor, in a slightly inclined arrangement with respect to a vertical direction, with a synchronous movement along a longitudinal axis that is parallel to a base of the insulating glazing unit;

actuating a sealing head, having supported thereon at least one sealing nozzle, with synchronous movements: along an inclined axis that is slightly inclined with respect to the vertical direction and perpendicular to the base of the insulating glazing unit, and about a rotation axis which is perpendicular to a face of the glass panes of the insulating glazing unit, said sealing head and said insulating glazing unit moving thereby with relative motion one with respect to the other;

actuating further said sealing head with an adjustment motion along a transverse axis that is perpendicular to the face of the glass panes of the glazing unit so as to position said at least one nozzle on a centerline of the spacer frame, the centerline position being established as a function of a thickness of a glass pane in contact with the conveyor and of the spacer frame;

actuating said sealing head, during said relative motion with respect to the glazing unit, to move continuously transversely to the insulating glazing unit along said transverse axis so that said at least one nozzle remains constantly positioned on the centerline of the spacer frame or of a position thereof; and deliver a sealant flow, by way of said at least one nozzle which is dosed according to the relative motion of the head with respect to the glazing unit and to a depth and width of the compartment of the glazing unit.

10. The method of claim 9, comprising:

detecting of a distance between a sensor of the sealing head and an outer face of a glass pane of the glazing unit that lies opposite with respect to the conveyor, and provide a signal of said sensor corresponding to said distance; and actuating transverse positioning of the sealing head along the transverse axis so as to maintain said at least one nozzle centered on the centerline of the spacer frame all throughout the sealing step.

* * * * *